United States Patent
Liu et al.

(10) Patent No.: US 8,660,433 B2
(45) Date of Patent: Feb. 25, 2014

(54) PILOT-ASSISTED DATA TRANSMISSION IN A COHERENT OPTICAL-COMMUNICATION SYSTEM

(75) Inventors: Xiang Liu, Marlboro, NJ (US); Chandrasekhar Sethumadhavan, Matawan, NJ (US)

(73) Assignee: Alcatel Lucent, Paris (FR)

( * ) Notice: Subject to any disclaimer, the term of this patent is extended or adjusted under 35 U.S.C. 154(b) by 570 days.

(21) Appl. No.: 12/964,929

(22) Filed: Dec. 10, 2010

(65) Prior Publication Data

US 2012/0148255 A1   Jun. 14, 2012

(51) Int. Cl.
*H04B 10/532*  (2013.01)
*H04J 14/02*   (2006.01)

(52) U.S. Cl.
USPC .......................................... 398/154; 398/152

(58) Field of Classification Search
USPC .......................................... 398/152, 154, 184
See application file for complete search history.

(56) References Cited

U.S. PATENT DOCUMENTS

| | | |
|---|---|---|
| 6,683,855 B1 | 1/2004 | Bordogna et al. |
| 6,928,047 B1 | 8/2005 | Xia |
| 7,212,741 B2 | 5/2007 | Myong et al. |
| 7,266,310 B1 | 9/2007 | Savory et al. |
| 7,315,575 B2 | 1/2008 | Sun et al. |
| 7,382,984 B2 | 6/2008 | McNicol et al. |
| 7,424,651 B2 | 9/2008 | Domagala et al. |
| 7,469,106 B2 | 12/2008 | Feced et al. |
| 7,532,820 B2 | 5/2009 | Aronson |
| 7,570,889 B2 | 8/2009 | Shastri et al. |
| 7,574,146 B2 | 8/2009 | Chiang et al. |
| 7,734,191 B1 | 6/2010 | Welch et al. |
| 7,747,169 B2 | 6/2010 | Koc |
| 7,747,177 B2 | 6/2010 | Chen et al. |
| 8,130,631 B2 * | 3/2012 | Henriksson et al. .......... 370/208 |
| 2007/0036555 A1 | 2/2007 | Chen et al. |

(Continued)

FOREIGN PATENT DOCUMENTS

| | | |
|---|---|---|
| WO | WO2009016571 A1 | 2/2009 |
| WO | 2010107439 A1 | 9/2010 |

OTHER PUBLICATIONS

Seb J. Savory, "Digital Filters for Coherent Optical Receivers," Optics Express, vol. 16, No. 2., 2008, pp. 804-817.

(Continued)

*Primary Examiner* — Shi K Li
(74) *Attorney, Agent, or Firm* — Yuri A. Gruzdkov; Steve Mendelsohn; Mendelsohn, Drucker & Dunleavy, P.C.

(57) ABSTRACT

In one embodiment, an optical transmission system transmits data using a format according to which a data frame has two or more pilot-symbol blocks, each having a guard interval, and two or more payload-symbol blocks that are concatenated without a guard interval between them. The use of guard intervals in the pilot-symbol blocks helps the synchronization and channel-estimation procedures performed at a receiver of the optical transmission system to be robust in the presence of certain transmission impairments. The absence of guard intervals in the payload-symbol blocks helps to minimize the transmission overhead and thus achieve relatively high payload-data throughput. Pilot-symbol blocks have a structure that enables the receiver to determine channel-response characteristics for each data frame and then apply appropriate channel-response-compensation procedures to signals corresponding to the payload-symbol blocks of the frame to recover, with a relatively low bit-error rate, the data encoded in those signals.

23 Claims, 4 Drawing Sheets

(56) References Cited

U.S. PATENT DOCUMENTS

| | | |
|---|---|---|
| 2008/0152361 A1 | 6/2008 | Chen et al. |
| 2009/0003488 A1 | 1/2009 | Ban |
| 2010/0150577 A1* | 6/2010 | Essiambre et al. ............ 398/188 |
| 2010/0158521 A1 | 6/2010 | Doerr et al. |
| 2012/0039606 A1* | 2/2012 | Grigoryan et al. ............. 398/65 |

OTHER PUBLICATIONS

Xiang Liu, et al., "Transmission of a 448-Gb/s Reduced-Guard-Interval CO-OFDM Signal with a 60-GHz Optical Bandwidth over 2000 km of ULAF and Five 80-GHz-Grid ROADMs," Optical Fiber Communication (OFC), collocated National Fiber Optic Engineers Conference, 2010 Conference on (OFC/NFOEC), 2010, 3 pages.

David C. Chu, "Polyphase Codes with Good Periodic Correlation Properties," published in IEEE Transactions on Information Theory, Jul. 1972, pp. 531-532.

K. Ishihara, et al. "Frequency-Domain Equalisation Without Guard Interval for Optical Transmission Systems," Electronics Letters, vol. 44, No. 25, pp. 1480-1482.

Chun Ju Youn, et al. "An Efficient and Frequency-Offset-Tolerant Channel Estimation and Synchronization Method for PDM CO-OFDM Transmission," ECOC 2010, 3 pages.

Timothy M. Schmidl, et al., "Robust Frequency and Timing Synchronization for OFDM," IEEE Transactions on Communications, vol. 45, No. 12, Dec. 1997, pp. 1613-1621.

U.S. Appl. No. 12/541,548, filed Aug. 24, 2009.

International Search Report and Written Opinion; Mailed Apr. 2, 2012 for the corresponding PCT Application No. PCT/US2011/063004.

Xiang, L. et al.: "Improving the Nonlinear Tolerance of Polarization-Division-Multiplexed CO-OFDM in Long-Haul Fiber Transmission", Journal of Lightwave Technology, IEEE Service Center, New York, NY, US, vol. PP, No. 16; Aug. 15, 2009; pp. 3632-3640; XP011257350.

Pulimamidi, N.: "Development of a New OFDM Transceiver Without Guard Interval", IEEE EIT 2007 Proceedings; Jan. 1, 2007; pp. 300-305; XP55502175.

Hyoung-Kyu, S. et al.: "Frequency-Offset Synchronization and Channel Estimation for OFDM-Based Transmission", IEEE Communications Letters, IEEE Service Center, Piscataway, NJ, US.; vol. 4, No. 3; Mar. 1, 2000; pp. 95-97; XP011083860.

* cited by examiner

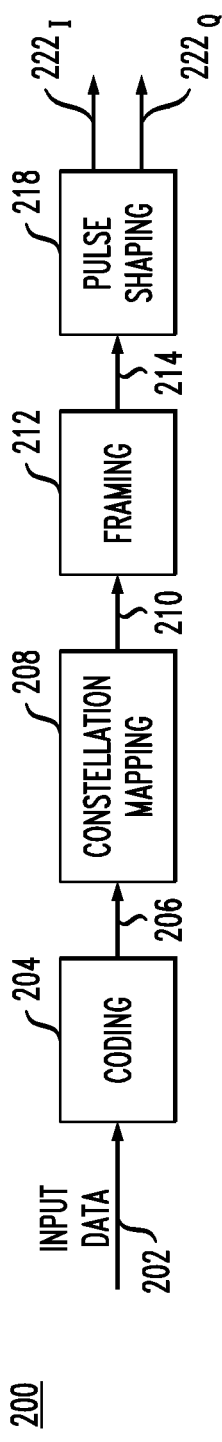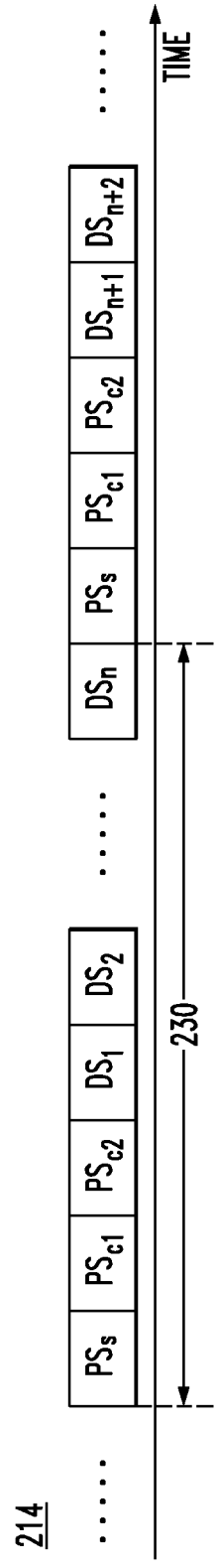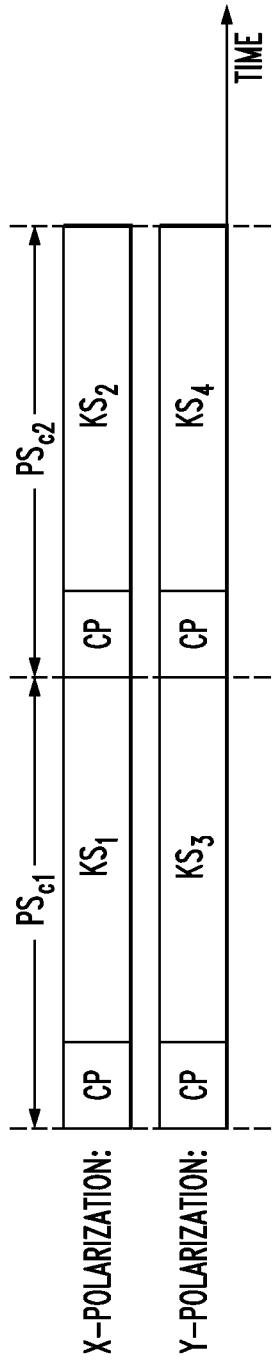

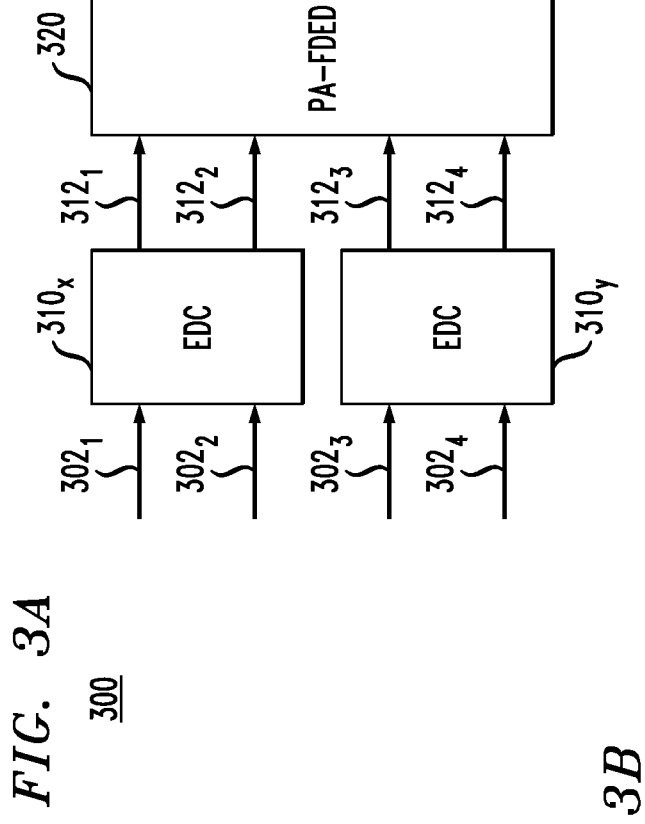

PILOT-ASSISTED DATA TRANSMISSION IN A COHERENT OPTICAL-COMMUNICATION SYSTEM

CROSS-REFERENCE TO RELATED APPLICATIONS

The subject matter of this application is related to that of U.S. Patent Application Publication No. 2012/0148264, which is incorporated herein by reference in its entirety.

BACKGROUND

1. Field of the Invention

The present invention relates to optical communication equipment and, more specifically but not exclusively, to signal processing in coherent optical transport systems.

2. Description of the Related Art

This section introduces aspects that may help facilitate a better understanding of the invention(s). Accordingly, the statements of this section are to be read in this light and are not to be understood as admissions about what is in the prior art or what is not in the prior art.

The next-generation of optical communication systems is being designed for relatively high data-transmission rates, e.g., higher than about 100 Gbit/s per channel. At these rates, the effects of chromatic dispersion (CD) and polarization-mode dispersion (PMD) significantly degrade the transmission performance of optical fiber links. Since practical implementation of dispersion compensation in the optical domain is relatively expensive, various digital-signal-processing (DSP) techniques, such as orthogonal frequency division multiplexing (OFDM), are used to mitigate the adverse effects of CD and PMD on signal transmission. However, one problem with optical OFDM is that it requires relatively sophisticated digital signal processing not only at the receiver, but also at the transmitter. In addition, optical OFDM has a relatively high peak-to-average power ratio (PAPR), which adversely affects the hardware cost by imposing rather stringent constraints on modulation and power-amplifier nonlinearities.

SUMMARY

Disclosed herein are various embodiments of an optical transport system that transmits data using a format according to which a data frame has two or more pilot-symbol blocks, each having a cyclic prefix or suffix, and one or more payload-symbol blocks, each of which is concatenated with an adjacent block without a guard interval between them. The use of cyclic prefixes/suffixes in the pilot-symbol blocks helps the synchronization and channel-estimation procedures performed at a receiver of the optical transmission system to be robust in the presence of transmission impairments, such as chromatic dispersion (CD) and/or polarization-mode dispersion (PMD). The absence of guard intervals in the payload-symbol blocks helps to minimize the transmission overhead and thus achieve relatively high payload-data throughput. Pilot-symbol blocks generated by the transmitter have a structure that enables the intended receiver to determine channel-response characteristics for each data frame so as to then apply appropriate channel-response-compensation procedures to signals corresponding to the payload-symbol blocks of the data frame to recover, with a relatively low bit-error rate, the data encoded in those signals.

According to one embodiment, provided is an optical transmitter having a digital signal processor that converts a first data stream into a first sequence of constellation symbols and generates a data frame comprising a first plurality of pilot-symbol blocks and a first set of one or more payload-symbol blocks. Each pilot-symbol block comprises a respective plurality of pilot symbols and a respective guard interval. Each payload-symbol block comprises a respective plurality of constellation symbols from the first sequence. At least one payload-symbol block and another block are concatenated without a guard interval between them, wherein the other block is either a pilot-symbol block of the same data frame or of the next data frame or a payload-symbol block of the same data frame. The optical transmitter further has an optical modulator that modulates an optical carrier to generate a modulated optical signal for transmission of the data frame over an optical communication link.

According to another embodiment, provided is an optical transport system having an optical transmitter and an optical receiver coupled to each other via an optical communication link. In operation, the optical transmitter converts a first data stream into a first sequence of constellation symbols and generates a data frame that comprises a first plurality of pilot-symbol blocks and a first set of one or more payload-symbol blocks. Each pilot-symbol block comprises a respective plurality of pilot symbols and a respective guard interval. Each payload-symbol block comprises a respective plurality of constellation symbols from the first sequence. At least one payload-symbol block and another block are concatenated without a guard interval between them, wherein the other block is either a pilot-symbol block or a payload-symbol block. The optical transmitter modulates an optical carrier to generate a modulated optical signal having encoded thereon the data frame and applies said modulated optical signal to the optical communication link. The optical receiver receives the modulated optical signal from the optical communication link and converts it into a first in-phase digital signal and a first quadrature-phase digital signal that have a first set of signal samples corresponding to the data frame. The optical receiver then processes the first set of signal samples to recover the data encoded in the first sequence of constellation symbols.

According to yet another embodiment, provided is an optical communication method having the steps of: converting a first data stream into a first sequence of constellation symbols; and generating a data frame that comprises a first plurality of pilot-symbol blocks and a first set of one or more payload-symbol blocks. Each pilot-symbol block comprises a respective plurality of pilot symbols and a respective guard interval. Each payload-symbol block comprises a respective plurality of constellation symbols from the first sequence. At least one payload-symbol block and another block are concatenated without a guard interval between them, wherein the other block is either a pilot-symbol block or a payload-symbol block. The method further has the step of modulating an optical carrier to generate a modulated optical signal for transmission of the data frame over an optical communication link.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 2A-2C illustrate the operation of a digital signal processor that can be used in the transmitter of the optical transmission system shown in FIG. 1 according to one embodiment of the invention; and FIGS. 3A-3C illustrate the operation of a digital signal processor that can be used in the receiver of the optical transmission system shown in FIG. 1 according to one embodiment of the invention.

DETAILED DESCRIPTION

OFDM transmission and single-carrier (SC) transmission with frequency-domain equalization (FDE) have similar digital-signal-processing (DSP) complexities. The main DSP difference between these two signal transmission techniques is that, in OFDM transmission, the inverse fast-Fourier-transform (IFFT) operation is performed at the transmitter side while, in SC-FDE transmission, it is performed at the receiver side. As a result, a transmitter in an SC-FDE transmission system may use a digital-signal processor of lesser processing power than that of a digital-signal processor used in an OFDM transmitter. In addition, an SC-FDE transmission system can advantageously be configured to have a smaller peak-to-average power ratio (PAPR) value than a comparably performing OFDM system, thereby relaxing the constraints on modulation and power-amplifier nonlinearities.

Figure 1:
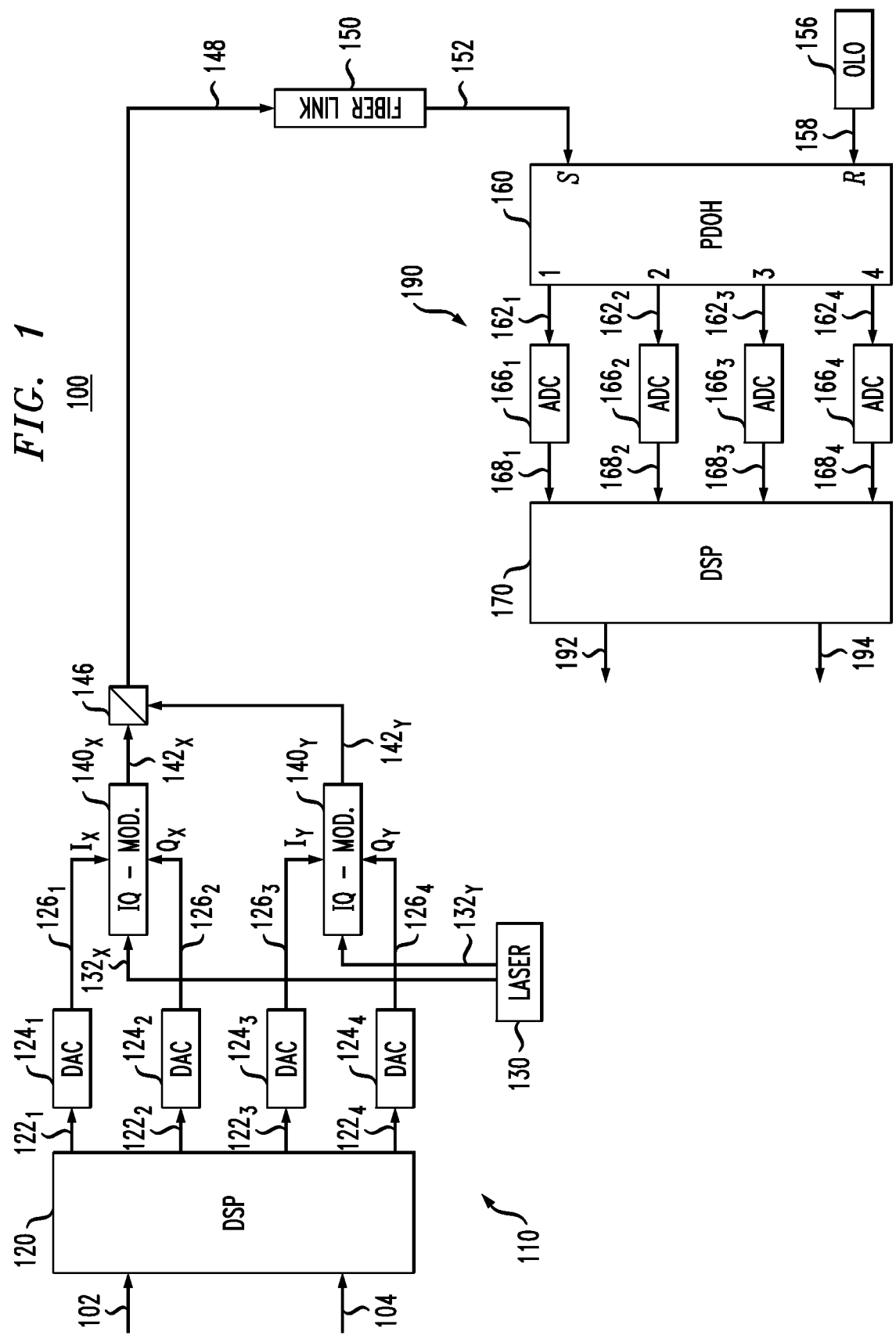
FIG. 1 shows a block diagram of an optical transmission system according to one embodiment of the invention.

FIG. 1 shows a block diagram of a single-carrier optical transmission system 100 according to one embodiment of the invention. System 100 has an optical transmitter 110 and an optical receiver 190 connected via a fiber link 150. In one embodiment, fiber link 150 is an amplified fiber link having one or more optical amplifiers (not explicitly shown in FIG. 1).

Transmitter 110 receives two independent data streams 102 and 104 for transmission to receiver 190. A digital-signal processor 120 processes data streams 102 and 104 as further described below in reference to FIGS. 2A-2C to generate digital signals $122_1$-$122_4$. Digital signals $122_1$-$122_4$ undergo a digital-to-analog conversion in digital-to-analog converters (DACs) $124_1$-$124_4$, respectively, to produce drive signals $126_1$-$126_4$. Drive signals $126_1$ and $126_2$ are in-phase (I) and quadrature-phase (Q) drive signals, respectively, corresponding to data stream 102. Drive signals $126_3$ and $126_4$ are similar in-phase and quadrature-phase drive signals corresponding to data stream 104.

An optical IQ modulator $140_X$ uses drive signals $126_1$ and $126_2$ to modulate an optical-carrier signal $132_X$ generated by a laser source 130 and to produce a modulated signal $142_X$. An optical IQ modulator $140_Y$ similarly uses drive signals $126_3$ and $126_4$ to modulate an optical-carrier signal $132_Y$ generated by laser source 130 and to produce a modulated signal $142_Y$. A polarization beam combiner 146 combines modulated signals $142_X$ and $142_Y$ to produce an optical polarization-division-multiplexed (PDM) signal 148. Note that optical-carrier signals $132_X$ and $132_Y$ have the same carrier frequency. Each of drive signals 126 can be amplified by an RF amplifier (not explicitly shown) before being applied to drive the corresponding optical IQ modulator 140.

Fiber link 150 receives signal 148 from beam combiner 146 for transmission to receiver 190. While propagating through fiber link 150, signal 148 is subjected to various transmission impediments, such as chromatic dispersion (CD) and polarization mode dispersion (PMD), and emerges at the receiver end of the fiber link as an optical signal 152.

Receiver 190 has an optical-to-electrical (O/E) converter 160 having (i) two input ports labeled S and R and (ii) four output ports labeled 1 through 4. Input port S receives optical signal 152. Input port R receives an optical reference signal 158 generated by an optical local oscillator (OLO) 156. Reference signal 158 has substantially the same optical-carrier frequency (wavelength) as signal 152. Reference signal 158 can be generated, e.g., using a tunable laser controlled by a wavelength-control loop (not explicitly shown in FIG. 1) that forces an output wavelength of the tunable laser to substantially track the carrier wavelength of signal 152. In various embodiments, optical local oscillator 156 may comprise a combination of tunable and/or non-tunable lasers, optical frequency converters, optical modulators, and optical filters appropriately connected to one another to enable the generation of reference signal 158.

O/E converter 160 mixes input signal 152 and reference signal 158 to generate eight mixed optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 152. For example, electrical signals $162_1$ and $162_2$ may be an analog in-phase signal and an analog quadrature-phase signal, respectively, corresponding to an x-polarization component of signal 152. Electrical signals $162_3$ and $162_4$ may similarly be an analog in-phase signal and an analog quadrature-phase signal, respectively, corresponding to a y-polarization component of signal 152.

In one embodiment, O/E converter 160 is a polarization-diverse 90-degree optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Application Publication No. 2010/0158521, U.S. patent application Ser. No. 12/541,548 (filed on Aug. 14, 2009), and International Patent Application No. PCT/US09/37746 (filed on Mar. 20, 2009), all of which are incorporated herein by reference in their entirety.

Each of electrical signals $162_1$-$162_4$ generated by O/E converter 160 are converted into digital form in a corresponding one of analog-to-digital converters (ADCs) $166_1$-$166_4$. Optionally, each of electrical signals $162_1$-$162_4$ may be amplified in a corresponding amplifier (not explicitly shown) prior to the resulting signal being converted into digital form. Digital signals $168_1$-$168_4$ produced by ADCs $166_1$-$166_4$ are processed by a digital signal processor 170, e.g., as further described below in reference to FIGS. 3A-3C, to recover the data applied by data streams 102 and 104 to transmitter 110. The recovered data are outputted from receiver 190 via output signals 192 and 194, respectively.

FIGS. 2A-2C illustrate the operation of a digital signal processor 200 that can be used to implement digital signal processor 120 (FIG. 1) according to one embodiment of the invention. More specifically, FIG. 2A shows a block diagram of processor 200. FIGS. 2B-2C show an exemplary frame structure used by digital signal processor 200.

Processor 200 processes an input data stream 202 to generate digital output signals $222_I$ and $222_Q$. In a representative embodiment, processor 120 (FIG. 1) is implemented using two processors 200 configured to operate in parallel to one another. More specifically, for the first of these two parallel processors 200, input data stream 202 is data stream 102, and digital output signals $222_I$ and $222_Q$ are digital signals $122_1$ and $122_2$, respectively. For the second of these two parallel processors 200, input data stream 202 is data stream 104, and digital output signals $222_I$ and $222_Q$ are digital signals $122_3$ and $122_4$, respectively.

Input data stream 202 is applied to a coding module 204, where it is optionally interleaved and subjected to forward-error-correction (FEC) coding.

A coded bit stream 206 produced by coding module 204 is applied to a constellation-mapping module 208, where it is converted into a corresponding sequence 210 of constellation symbols. The constellation used by constellation-mapping module 208 can be, for example, a QAM (Quadrature Amplitude Modulation) constellation or a QPSK (Quadrature Phase Shift Keying) constellation.

Symbol sequence 210 is applied to a framing module 212, where it is converted into a corresponding sequence 214 of data frames. When processor 200 is used to implement DSP 120 (FIG. 1), sequence 214 consists of two parallel subsequences, one corresponding to the X polarization and the other corresponding to the Y polarization. Frame sequence 214 produced by framing module 212 is then applied to a pulse-shaping module 218, where it is converted into output signals $222_I$ and $222_Q$.

FIG. 2B shows an exemplary structure of frame sequence 214 generated by framing module 212. A representative frame 230 of frame sequence 214 comprises a plurality of pilot-symbol blocks (PSs) and a plurality of payload-symbol blocks (DSs). For example, frame 230 has (i) pilot-symbol blocks $PS_s$, $PS_{c1}$, and $PS_{c2}$ and (ii) payload-symbol blocks $DS_1$, $DS_2$, ..., $DS_n$. One important difference between a pilot-symbol block PS and a payload-symbol block DS is that the former has a cyclic prefix (CP, also sometimes referred to as a guard interval) while the latter does not. The use of cyclic prefixes in pilot-symbol blocks PS helps the synchronization and channel-estimation procedures performed at the receiver, e.g., receiver 190 (FIG. 1), to be robust in the presence of transmission impairments, such as CD and/or PMD. The nonuse of cyclic prefixes in payload-symbol blocks DS helps to minimize the transmission overhead and thus achieve relatively high payload-data throughput. Channel-compensation procedures applied to the CP-free payload-symbol blocks (blocks DS in FIG. 2B) rely on the channel information obtained from pilot-symbol blocks $PS_{c1}$ and $PS_{c2}$ and are described in more detail below in reference to FIGS. 3A-3C.

Pilot-symbol block $PS_s$ is designed to aid the receiver, e.g., receiver 190 (FIG. 1), in frequency estimation and frame synchronization. An exemplary pilot-symbol block $PS_s$ comprises (i) cyclic prefix $CP_s$ and (ii) symbol sequence $E(n)$ having 2N symbols (i.e., n=1, 2, ... 2N), in which the string that has the first N symbols is identical to the string that has the last N symbols. Cyclic prefix $CP_s$ has a copy of the last L symbols of symbol sequence $E(n)$. In mathematical terms, pilot-symbol block $PS_s$ is expressed by Eq. (1):

$$PS_S = [E(n=(2N-L+1):2N), E(n=1:2N)] \quad (1)$$

where the ":" symbol indicates a range for n starting from the value to the left of the symbol and ending with the value to the right of the symbol.

In one embodiment, symbol sequence $E(n)$ is constructed as follows. First, a set of 2N orthogonal (in the OFDM sense) frequencies is selected and consecutively numbered starting from the lowest and ending with the highest frequency. Second, each of the odd-numbered frequencies is assigned the amplitude of zero, and each of the even-numbered frequencies is assigned a symbol that is randomly selected from a QPSK constellation. Recall that a QPSK constellation consists of four constellation points positioned, with uniform angular spacing, on a circle that is centered on the origin of a complex plane. The result of this assignment is a set having 2N frequency-domain symbols, half of which are zeros. Finally, an inverse fast-Fourier-transform (IFFT) operation is applied to this set of 2N frequency-domain symbols to arrive at symbol sequence $E(n)$.

In another embodiment, symbol sequence $E(n)$ is expressed by Eq. (2):

$$E(n) = \exp(-j\pi(n-1)^2/N) \quad (2)$$

where n=1, 2, ..., 2N.

By having two identical halves, symbol sequence $E(n)$ can readily be used for autocorrelation to find the starting point of the frame, and to find the frequency offset between carrier signals 132 and reference signal 158. Suitable methods that can be used to perform autocorrelation-based synchronization are described, e.g., in an article by T. M. Schmidl and D. C. Cox entitled "Robust Frequency and Timing Synchronization for OFDM," published in IEEE Transactions on Communications, Vol. 45, No. 12, December 1997, pp. 1613-1621, which article is incorporated herein by reference in its entirety.

In one embodiment, pilot-symbol block $PS_s$ corresponding to the X-polarization (e.g., represented by modulated signal $142_X$, FIG. 1) is the same as pilot-symbol block $PS_s$ corresponding to the Y-polarization (e.g., represented by modulated signal $142_Y$, FIG. 1). In an alternative embodiment, the X- and Y-polarizations may use different respective pilot-symbol blocks $PS_s$.

FIG. 2C shows an exemplary structure of pilot-symbol blocks $PS_{c1}$ and $PS_{c2}$. Note that the pilot-symbol blocks $PS_{c1}$ and $PS_{c2}$ corresponding to the X-polarization may differ from the pilot-symbol blocks $PS_{c1}$ and $PS_{c2}$ corresponding to the Y-polarization. Pilot-symbol blocks $PS_{c1}$ and $PS_{c2}$ are designed to aid the receiver, e.g., receiver 190 (FIG. 1), in channel estimation and channel compensation.

Similar to pilot-symbol block $PS_s$, each pilot-symbol block $PS_c$ has a cyclic prefix (CP) prepended to a respective (known, predetermined) body sequence of symbols (KS). Cyclic prefix CP is constructed by taking several symbols from the end of body sequence KS, which makes each pilot-data set $PS_c$ a partially cyclic sequence. The length (L) of cyclic prefix CP is selected to be longer than the expected duration of the impulse response of the channel, e.g., fiber link 150, FIG. 1. This property of pilot-symbol blocks in frame sequence 214 enables the intended receiver to process the pilot-symbol blocks in the received signal (e.g., signal 152, FIG. 1) in a manner that mitigates inter-block interference imposed by the fiber link due to the effects of CD and PMD.

Body sequences KS corresponding to pilot-symbol blocks $PS_{c1}$ and $PS_{c2}$ have the same length, which is larger than the length of a payload-symbol block DS in one embodiment (also see the description of FIG. 3C below). In a representative implementation, each body sequence KS is a special polyphase sequence of length 2N, wherein the amplitudes of all non-zero symbols in the time domain have different phases but the same amplitude, where N is a positive integer. One purpose of using this type of a sequence is to enable the receiver to accurately and uniformly probe the channel-response function, H, over the entire frequency range of interest. Channel-response function H is a frequency-dependent 2×2 matrix whose elements are complex functions of frequency that describe the combined signal-transfer characteristics of the front end of the transmitter (e.g., transmitter 110, FIG. 1), the fiber link (e.g., fiber link 150, FIG. 1), and the front end of the receiver (e.g., receiver 190, FIG. 1).

In one embodiment, each body sequence KS has 2N symbols, and the individual body sequences $KS_1$-$KS_4$ shown in FIG. 2C are expressed by Eqs. (3)-(5):

$$KS_1(n) = \exp(-j\pi(n-1)^2/N) \quad (3)$$

$$KS_2(n) = \exp(-j\pi n(n-1)/N) \quad (4)$$

$$KS_3 = KS_2, \; KS_4 = KS_1 \quad (5)$$

where n=1, 2, ..., 2N. The relationship between different body sequences KS expressed by Eq. (5) may be advantageous in that it enables the receiver to readily calculate, in the frequency domain, all four elements of the 2×2 channel-response matrix as a function of frequency. A suitable matrix-calculation method that can be used for this purpose is described, e.g., in an article by C. J. Youn, "An Efficient and Frequency-Offset-Tolerant Channel Estimation and Synchronization Method for PDM CO-OFDM Transmission," published in the 2010 European Conference on Optical Communications (ECOC '10) as paper P4.06.

In alternative embodiments, additional suitable polyphase sequences can be constructed from the polyphase sequences defined by Eqs. (3)-(4), e.g., by one or more of the following: (i) cyclically shifting the entire sequence; (ii) phase shifting each symbol of the sequence by a constant phase; (iii) taking the m-th power of each symbol of the sequence, where m is an integer greater than one; and (iv) phase-conjugating the entire sequence. Additional suitable polyphase sequences (or codes) with uniform amplitudes in both the time and frequency domains can be constructed based on the general description provided in the article by David C. Chu, "Polyphase Codes with Good Periodic Correlation Properties," published in IEEE Transactions on Information Theory, July 1972, pp. 531-532, which is incorporated herein by reference in its entirety.

Note that pilot-symbol blocks $PS_{c1}$ and $PS_{c2}$ corresponding to the X polarization are synchronous with pilot-symbol blocks $PS_{c1}$ and $PS_{c2}$, respectively, corresponding to the Y polarization. This characteristic of pilot-symbol blocks $PS_{c1}$ and $PS_{c2}$ is a manifestation of a more-general characteristic of data frame 230, according to which each symbol block corresponding to the X polarization is synchronous with a counterpart symbol block corresponding to the Y polarization. As such, pilot-symbol blocks $PS_s$ corresponding to the X polarization is synchronous with pilot-symbol block $PS_s$ corresponding to the Y polarization. Similarly, each payload-symbol block $DS_i$ corresponding to the X polarization is synchronous with pilot-symbol block $DS_i$ corresponding to the Y polarization (see FIG. 2B).

Referring back to FIG. 2A, frame sequence 214 produced by framing module 212 is applied to a pulse-shaping module 218, where it is converted into output signals $222_I$ and $222_Q$. Pulse shaping implemented in pulse-shaping module 218 is a process of generating a digital waveform that, after being converted into a corresponding analog signal, can be applied to an optical modulator to modulate an optical-carrier signal, such as optical-carrier signal $132_X$ or $132_Y$ (FIG. 1), so that the resulting modulated optical signal is modulated with symbols corresponding to the various blocks of frame sequence 214. In one configuration, oversampling may be applied, e.g., by duplicating each signal sample one or more times for output signals $222_I$ and $222_Q$.

Figure 3C:
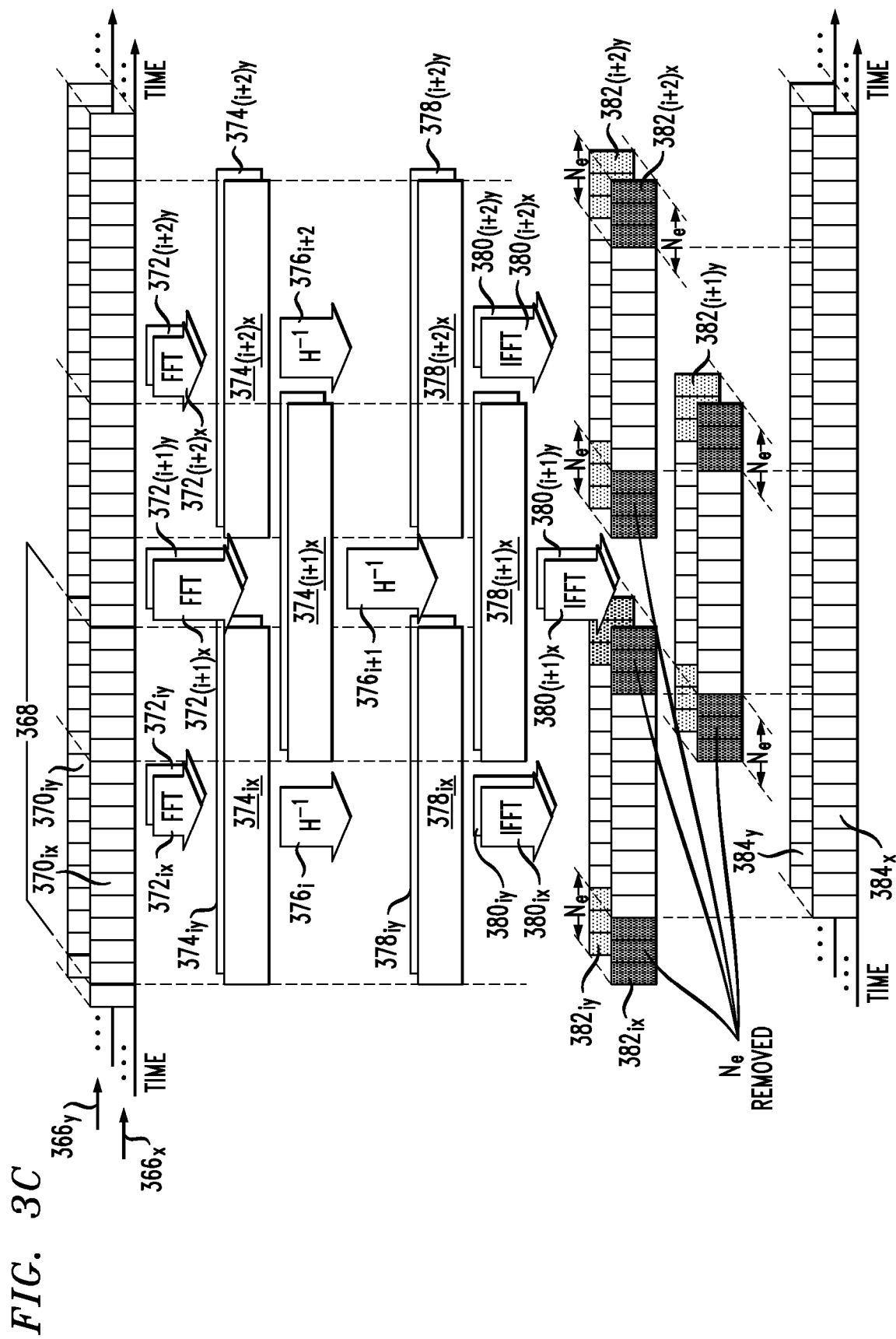

FIGS. 3A-3C illustrate the operation of a digital signal processor 300 that can be used to implement digital signal processor 170 (FIG. 1) according to one embodiment of the invention. More specifically, FIGS. 3A-3B show block diagrams of processor 300. FIG. 3C shows the processing implemented in an FDCCE (frequency-domain-channel-compensation/equalization) sub-module 352 of processor 300. When processor 300 is used as processor 170, input signals $302_1$-$302_4$ correspond to signals $168_1$-$168_4$ (FIG. 1), respectively, and output signals $332_x$ and $332_y$ correspond to output signals 192 and 194 (FIG. 1), respectively.

EDC (electronic dispersion compensation) modules 310 perform digital signal processing that mitigates the detrimental effects of chromatic dispersion imposed on input signal 152 by fiber link 150. In particular, EDC module $310_x$ processes input signals $302_1$-$302_2$ corresponding to the first principal polarization axis (e.g., the x axis) of PDOH 160 (FIG. 1). Similarly, EDC module $310_y$ processes input signals $302_3$-$302_4$ corresponding to the second principal polarization axis (e.g., the y axis) of PDOH 160. Note that the X and Y polarizations used at the transmitter may or may not be aligned with the principal polarization axes (i.e., the x and y axes) of PDOH 160. Various EDC modules that can be used to implement EDC module 310 are disclosed, e.g., in U.S. Pat. Nos. 7,570,889, 7,532,820, and 7,382,984, all of which are incorporated herein by reference in their entirety.

Dispersion-compensated signals $312_1$-$312_4$ produced by EDC modules $310_x$ and $310_y$ are applied to a pilot-assisted frequency-division-equalization and decoding (PA-FDED) module 320 that processes these signals, e.g., as further described below in reference to FIGS. 3B-3C, to recover the original data streams applied to the transmitter for transmission, e.g., data streams 102 and 104 of FIG. 1. More specifically, PA-FDED module 320 generates data stream $332_x$ that carries the data corresponding to the first independently modulated component of signal 152 (e.g., component $142_X$, FIG. 1), and similarly generates data stream $332_y$ that carries the data corresponding to the second independently modulated component of signal 152 (e.g., component $142_Y$, FIG. 1).

FIG. 3B shows a block diagram of PA-FDED module 320 according to one embodiment of the invention. PA-FDED module 320 has a synchronization sub-module 340 that receives, as its input, dispersion-compensated signals $312_1$-$312_4$. Synchronization sub-module 340 relies on the above-described properties of pilot-symbol blocks $PS_s$ to determine the start of each frame 230 (also see FIG. 2B). In one configuration, synchronization sub-module 340 calculates an autocorrelation function defined by Eq. (6):

$$P(n) = \sum_{k=1}^{N} [r_x(n+k-1)*r_x(n+k+N-1) + r_y(n+k-1)*r_y(n+k+N-1)] \quad (6)$$

where the "*" symbol denotes a complex conjugate; $r_x(n)$ is a complex value whose real part is a signal sample provided by signal $312_1$ and whose imaginary part is a corresponding signal sample provided by signal $312_2$; and $r_y(n)$ is a complex value whose real part is a signal sample provided by signal $312_3$ and whose imaginary part is a corresponding signal sample provided by signal $312_4$. Since symbol sequence E(n) of pilot-symbol block $PS_s$ has two identical portions of length N, the absolute value of function P(n) has a pronounced maximum that is temporally aligned with the first symbol of symbol sequence E(n) and, as such, can be used to determine the temporal position of the corresponding frame 230.

An FE (frequency-estimation/compensation) sub-module 344 that is located downstream from synchronization sub-module 340 performs electronic estimation and compensation of a mismatch between the carrier-frequency of input signal 152 and the frequency of reference signal 158 (see FIG. 1). In one embodiment, FE sub-module 344 determines the phase of $P(n_{max})$, where $n_{max}$ is the time slot corresponding to the maximum of the absolute value of function P(n) (see Eq. (6)) determined by synchronization sub-module 340. FE sub-module 344 then uses the phase of $P(n_{max})$ to calculate the frequency offset between signals 152 and 158. If the frequency offset is zero, then $P(n_{max})$ is real and its phase is zero.

If the frequency offset is not zero, then $P(n_{max})$ is complex and its phase is directly related to the frequency offset and the duration of pilot-symbol block $PS_s$. Because the frequency offset may change over time, FE sub-module 344 performs the frequency-offset calculation for each received frame 230.

After the frequency offset is determined, FE sub-module 344 performs frequency-mismatch compensation by applying to each signal sample a phase shift equal to the frequency offset multiplied by $2\pi$ and the time elapsed between the start of the frame determined by synchronization sub-module 340 and the signal sample. Various FE modules that can be adapted to function as FE sub-module 344 are disclosed, e.g., in U.S. Pat. No. 7,747,177 and U.S. Patent Application Publication No. 2008/0152361, both of which are incorporated herein by reference in their entirety.

A CE (channel-estimation) sub-module 348 uses signal samples corresponding to pilot-symbol blocks $PS_{c1}$ and $PS_{c2}$ to determine the channel-response function, H, which can be expressed in the frequency domain as a 2×2 Jones matrix given by Eq. (7):

$$H(f) = \begin{pmatrix} a(f) & b(f) \\ c(f) & d(f) \end{pmatrix} \quad (7)$$

More specifically, using the a priori knowledge of body sequences $KS_1$, $KS_2$, $KS_3$, and $KS_4$, CE sub-module 348 constructs channel-response function H so that the application of that channel-response function to these body sequences transforms them into the received signal samples corresponding to these known body sequences. Note that an individual channel-response function H can be calculated by CE sub-module 348 for each frame 230, which enables the receiver to appropriately track time-dependent channels.

FIG. 3C also shows exemplary processing implemented in FDCCE (frequency-domain channel-compensation/equalization) sub-module 352. More specifically, the shown processing handles signal samples corresponding to the payload of a single transmitted frame (e.g., payload-symbol blocks DS in frame 230 having data corresponding to both the X and Y polarizations, see FIG. 2B) and, as such, uses the channel-response function H determined by channel-estimation sub-module 348. For processing each new frame, FDCCE sub-module 352 uses a corresponding new channel-response function H determined by and received from CE sub-module 348.

As already indicated above, the symbols of payload-symbol blocks DS in frame 230 do not have cyclic prefixes. As a result, inter-block interference (IBI) occurs at the receiver. To mitigate the adverse effects of IBI, FDCCE sub-module 352 performs, as further described below and with respect to FIG. 3C, overlap FDCCE processing with a sliding window 368 that has 2N consecutive signal samples from a sequence 366 of frequency-corrected signal samples corresponding to the payload of a received frame. Sequence 366 consists of two parallel sub-sequences, i.e., a sequence $366_x$ that corresponds to signals $312_1$-$312_2$ and a sequence $366_y$ that corresponds to signals $312_3$-$312_4$ (also see FIGS. 3A-3B). Note that signal samples in sequence $366_x$ have contributions both from the symbols carried by signal $142_X$ and from the symbols carried by signal $142_Y$ (FIG. 1). Signal samples in sequence $366_y$ similarly have contributions both from the symbols carried by signal $142_X$ and from the symbols carried by signal $142_Y$ (FIG. 1).

For an i-th position of sliding window 368, FDCCE sub-module 352 applies: (i) a fast Fourier transform (FFT) $372_{ix}$ to a block $370_{ix}$ of 2N signal samples located inside the window and belonging to sequence $366_x$ and (ii) an FFT $372_{iy}$ to a block $370_{iy}$ of 2N signal samples located inside the window and belonging to sequence $366_y$. FFT operation $372_{ix}$ converts block $370_{ix}$ into a corresponding block $374_{ix}$ of 2N frequency components. FFT operation 374 similarly converts block $370_{iy}$ into a corresponding block $374_{iy}$ of 2N frequency components.

Blocks $374_{ix}$ and $374_{iy}$ are subjected to a frequency-domain-equalization (FDE) procedure $376_i$, which converts these blocks into blocks $378_{ix}$ and $378_{iy}$. Similar to blocks $374_i$, each of blocks $378_{ix}$ and $378_{iy}$ has 2N frequency components. FDE procedure $376_i$ includes the application of inverse channel-response function $H^{-1}$, which is derived by FDCCE sub-module 352 from channel-response function H (see Eq. (7)) determined by channel-estimation sub-module 348. Since channel-response function H generally has a non-diagonal form (i.e., $b(f) \neq 0$ and $c(f) \neq 0$), FDE procedure 376; mixes frequency components from blocks $374_{ix}$ and $374_{iy}$ to produce the corresponding frequency components for blocks $378_{ix}$ and $378_{iy}$. Note that FFT operations $372_i$ do not have this feature because (i) block $374_{ix}$ is produced by operating solely on block $370_{ix}$ and without using any signal samples from block $370_{iy}$ and (ii) block $374_{iy}$ is produced by operating solely on block $370_{iy}$ and without using any signal samples from block $370_{ix}$.

Blocks $378_{ix}$ and $378_{iy}$ are subjected to inverse FFT (IFFT) operations $380_{ix}$ and $380_{iy}$, respectively. IFFT operation $380_{ix}$ converts block $378_{ix}$ into 2N time-domain signal samples, which form block $382_{ix}$. IFFT operation $380_{iy}$ similarly converts block $378_{iy}$ into 2N time-domain signal samples, which form block $382_{iy}$. Similar to FFT operations $372_i$, IFFT operations $380_i$ do not mix the x and y blocks.

Block $382_{ix}$ is truncated to remove $N_e$ signal samples from the beginning of the block and $N_e$ signal samples from the end of the block, where $N_e$ is a predetermined number chosen so that the signal samples affected by IBI are being truncated out. The remaining portion of block $382_{ix}$ having $2N-2N_e$ signal samples is used to form sequence $384_x$ of equalized signal samples that is output from FDCCE sub-module 352 to the downstream sub-modules of PA-FDED module 320. Block 384 is similarly truncated to remove $N_e$ signal samples from the beginning of the block and $N_e$ signal samples from the end of the block. The remaining portion of block 384 having $2N-2N_e$ signal samples is used to form sequence $384_y$ of equalized signal samples that is also output from FDCCE sub-module 352 to the downstream sub-modules of PA-FDED module 320.

Sliding window 368 is shifted down sequences $366_x$ and $366_y$ by $2N-2N_e$ signal samples to the (i+1)-th position, and the processing that is described above for the i-th is repeated for the (i+1)-th position as indicated in FIG. 3C. The shifts of sliding window 368 by $2N-2N_e$ signal samples and the corresponding processing are repeated until all of the payload symbols of the corresponding frame 230 for both X- and Y-polarizations have been recovered.

In one configuration, $N_e=L/2$ and $2N-2N_e=N_{DS}$, where L is the length of cyclic prefix CP in pilot-symbol blocks $PS_{c1}$ and $PS_{c2}$ (FIG. 2C), and $N_{DS}$ is the length of a payload-symbol block (DS) in frame 230 (FIG. 2B). In this configuration, the processing performed at the i-th position of sliding window 368 recovers all symbols of payload-symbol block $DS_i$ in frame 230 (see FIG. 2B). To recover the symbols of the first payload-symbol block in the frame ($DS_1$), sliding window 368 is positioned so that the first $N_e$ signal samples inside the window belong to pilot-symbol block $PS_{c2}$ of the same frame. To recover the symbols of the last payload-symbol block in the frame ($DS_n$), sliding window 368 is positioned so that the last $N_e$ signal samples inside the window belong to pilot-symbol block $PS_s$ of the next frame.

Referring back to FIG. 3B, equalized sequences $384_x$ and $384_y$ produced by FDCCE sub-module 352 are applied to a phase-estimation/phase-correction (PE/PC) sub-module 356. PE/PC sub-module 356 performs digital processing that corrects or compensates for slowly changing phase shifts between input signal 152 and reference signal 158 (FIG. 1), and then estimates the phase of the signal samples in equalized sequences $384_x$ and $384_y$ for constellation demapping and decoding. Various processing modules that can be used to implement PE/PC sub-module 356 are disclosed, e.g., in above-cited U.S. Patent Application Publication No. 2008/0152361 and also in U.S. Pat. No. 7,688,918 and U.S. Patent Application Publication No. 2008/0075472, both of which are incorporated herein by reference in their entirety.

A demapping sub-module 360 uses the phase estimates obtained by PE/PC sub-module 356 and the constellation map to convert equalized sequences $384_x$ and $384_y$ into the corresponding sequences of constellation symbols. Demapping sub-module 360 then decodes each constellation symbol to convert it into the corresponding set of bits, thereby generating bit streams $362_x$ and $362_y$, corresponding to equalized sequences $384_x$ and $384_y$, respectively. In the absence of errors, bit stream $362_x$ is a copy of bit stream $206_x$, and bit stream $362_y$ is a copy of bit stream $206_Y$ (also see FIG. 2A). When decoding errors are present, a bit stream 362 may differ somewhat from the corresponding bit stream 206.

An FEC (forward error correction) sub-module 364 performs error correction in bit streams $362_x$ and $362_y$ using data redundancies that were introduced into the corresponding bit streams 206 by coding modules 204 (FIG. 2A). The resulting error-corrected bit streams are output via signals $332_x$ and $332_y$. Many FEC methods suitable for use in FEC sub-module 364 are known in the art. Both hard-decision and soft-decision decoding may be implemented in various embodiments of FEC sub-module 364. Several representative examples of such methods are disclosed, e.g., in U.S. Pat. Nos. 7,734,191, 7,574,146, 7,424,651, 7,212,741, and 6,683,855, all of which are incorporated herein by reference in their entirety.

While this invention has been described with reference to illustrative embodiments, this description is not intended to be construed in a limiting sense. Although various embodiments of the invention have been described in reference to polarization-division-multiplexed (PDM) signals, the invention is not so limited and may be similarly applied to processing non-PDM signals. Various modifications of the described embodiments, as well as other embodiments of the invention, which are apparent to persons skilled in the art to which the invention pertains are deemed to lie within the principle and scope of the invention as expressed in the following claims.

The term "single-carrier" is a term of art that is used in this specification to contrast embodiments of the optical transmission system disclosed herein with an optical OFDM transmission system. This term should not be interpreted to imply that embodiments of the invention are not compatible with the WDM technology. One of ordinary skill in the art will appreciate that certain signal processing techniques disclosed herein may be applied to each of different carrier frequencies (wavelengths) of a WDM multiplex.

As used herein, the term "synchronous" refers to temporal alignment of two data or symbol blocks, two symbols, and/or the time slots corresponding to them. For example, two symbol blocks are considered to be synchronous if their leading edges arrive at a specified location (e.g., an input port or an output port) substantially simultaneously, i.e., the difference between the times of arrival is smaller than a designated relatively small tolerance. Similarly, two symbols are considered to be synchronous if their leading edges arrive at a specified location substantially simultaneously, i.e., the difference between the times of arrival is smaller than a designated relatively small tolerance.

Although various embodiments of the invention have been described in reference to cyclic prefixes, the invention is not so limited. Based on the provided description, one skilled in the art will be able to similarly practice the invention with cyclic suffixes instead of or in addition to cyclic prefixes. As used herein, the term "guard interval" should be interpreted as a general term that covers both cyclic prefixes and cyclic suffixes.

In various embodiments, each data frame has at least one payload-symbol block ($DS_i$, FIG. 2B) that is concatenated with another block without a guard interval between them. For example, if data frames use cyclic prefixes as guard intervals, then one of such concatenation points is located at the boundary between the last pilot-symbol block of a data frame and the first payload-symbol block of the same data frame, e.g., between pilot-symbol block $PS_{c2}$ and payload-symbol block $DS_1$ in FIG. 2B. Alternatively, if data frames use cyclic suffixes as guard intervals, then one of such concatenation points is located at the boundary between the last payload-symbol block of a data frame and the first pilot-symbol block of the next data frame, e.g., between payload-symbol block $DS_n$ and the adjacent pilot-symbol block $PS_s$ in FIG. 2B.

The present invention may be implemented as circuit-based processes, including possible implementation on a single integrated circuit.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An optical transmitter, comprising:
a digital signal processor configured to convert a first data stream into a first sequence of constellation symbols and to generate a data frame that comprises:
a first plurality of pilot-symbol blocks, wherein each pilot-symbol block comprises a respective plurality of pilot symbols and a respective guard interval; and
a first set of one or more payload-symbol blocks, wherein each payload-symbol block comprises a respective plurality of constellation symbols from the first sequence; and
an optical modulator configured to modulate an optical carrier to generate a modulated optical signal for transmission of the data frame over an optical communication link, wherein:
at least one payload-symbol block and another block are concatenated without a guard interval between them;
the other block is either a pilot-symbol block or a payload-symbol block; and
the first plurality of pilot-symbol blocks comprises:
a first channel-estimation block having a first polyphase sequence of symbols; and
a second channel-estimation block having a second polyphase sequence of symbols different from the first polyphase sequence of symbols.

2. The optical transmitter of claim 1, wherein the first set of one or more payload-symbol blocks comprises a plurality of payload-symbol blocks, wherein each pair of consecutive payload-symbol blocks in the first set is concatenated without a guard interval between them.

3. The optical transmitter of claim 1, wherein the first plurality of pilot-symbol blocks comprises a frame-synchronization block having a first string of N pilot symbols concatenated with a second string of N pilot symbols, said second string being a copy of the first string, where N is a positive integer.

4. The optical transmitter of claim 1, wherein the symbols of the first polyphase sequence and the symbols of the second polyphase sequence have equal amplitudes.

5. The optical transmitter of claim 1, wherein:
the first polyphase sequence has a constant amplitude and a phase pattern defined by phase sequence $\phi_1(n)$, which is expressed as:

$$\phi_1(n)=\pi(n-1)^2/N; \text{ and}$$

the second polyphase sequence has a constant amplitude and a phase pattern defined by phase sequence $\phi_2(n)$, which is expressed as:

$$\phi_2(n)=\pi n(n-1)/N,$$

where n=1, 2, . . . , 2N and N is a positive integer.

6. The optical transmitter of claim 1, wherein:
the digital processor is further configured to convert a second data stream into a second sequence of constellation symbols, wherein the data frame further comprises:
a second plurality of pilot-symbol blocks, wherein each pilot-symbol block comprises a respective plurality of pilot symbols and a respective guard interval; and
a second set of one or more payload-symbol blocks, wherein each payload-symbol block of the second set comprises a respective plurality of constellation symbols from the second sequence;
the optical modulator is configured to modulate a first polarization of the modulated optical signal with the symbols of the first plurality of pilot-symbol blocks and the first set of one or more payload-symbol blocks; and
the optical modulator is further configured to modulate a second polarization of the modulated optical signal with the symbols of the second plurality of pilot-symbol blocks and the second set of one or more payload-symbol blocks.

7. The optical transmitter of claim 6, wherein:
the first plurality of pilot-symbol blocks is synchronous with the second plurality of pilot-symbol blocks; and the first set of one or more payload-symbol blocks is synchronous with the second set of one or more payload-symbol blocks.

8. The optical transmitter of claim 6, wherein:
the first plurality of pilot-symbol blocks comprises a first frame-synchronization block having a first string of N pilot symbols concatenated with a second string of N pilot symbols, said second string being a copy of the first string, where N is a positive integer;
the second plurality of pilot-symbol blocks comprises a second frame-synchronization block having a third string of N pilot symbols concatenated with a fourth string of N pilot symbols, said fourth string being a copy of the third string; and
the third string is different from the first string.

9. The optical transmitter of claim 6, wherein:
the first plurality of pilot-symbol blocks comprises:
  a first channel-estimation block having a first polyphase sequence of symbols; and
  a second channel-estimation block having a second polyphase sequence of symbols different from the first polyphase sequence of symbols; and
the second plurality of pilot-symbol blocks comprises:
  a third channel-estimation block having the second polyphase sequence; and
  a fourth channel-estimation block having the first polyphase sequence, wherein:
    the first channel-estimation block is synchronous with the third channel-estimation block; and
    the second channel-estimation block is synchronous with the fourth channel-estimation block.

10. An optical transport system, comprising:
an optical transmitter; and
an optical receiver coupled to the optical transmitter via an optical communication link, wherein:
the optical transmitter is configured to convert a first data stream into a first sequence of constellation symbols and to generate a data frame that comprises:
  a first plurality of pilot-symbol blocks, wherein each pilot-symbol block comprises a respective plurality of pilot symbols and a respective guard interval; and
  a first set of one or more payload-symbol blocks, wherein each payload-symbol block comprises a respective plurality of constellation symbols from the first sequence;
at least one payload-symbol block and another block are concatenated without a guard interval between them, wherein the other block is either a pilot-symbol block or a payload-symbol block;
the optical transmitter is further configured to modulate an optical carrier to generate a modulated optical signal having encoded thereon the data frame and to apply said modulated optical signal to the optical communication link;
the optical receiver is configured to receive the modulated optical signal from the optical communication link and to convert the received modulated optical signal into a first in-phase digital signal and a first quadrature-phase digital signal that have a first set of signal samples corresponding to the data frame;
the optical receiver is further configured to process the first set of signal samples to recover the data encoded in the first sequence of constellation symbols;

the optical transmitter is further configured to convert a second data stream into a second sequence of constellation symbols, wherein the data frame further comprises:
  a second plurality of pilot-symbol blocks, wherein each pilot-symbol block comprises a respective plurality of pilot symbols and a respective guard interval; and
  a second set of one or more payload-symbol blocks, wherein each payload-symbol block of the second set comprises a respective plurality of constellation symbols from the second sequence;
the optical transmitter is further configured to modulate a first polarization of the modulated optical signal with the symbols of the first plurality of pilot-symbol blocks and the first set of one or more payload-symbol blocks;
the optical transmitter is further configured to modulate a second polarization of the modulated optical signal with the symbols of the second plurality of pilot-symbol blocks and the second set of one or more payload-symbol blocks;
the first plurality of pilot-symbol blocks comprises a first frame-synchronization block having a first string of N pilot symbols concatenated with a second string of N pilot symbols, said second string being a copy of the first string, where N is a positive integer;
the second plurality of pilot-symbol blocks comprises a second frame-synchronization block having a third string of N pilot symbols concatenated with a fourth string of N pilot symbols, said fourth string being a copy of the third string; and
the third string is different from the first string.

11. The optical transport system of claim 10, wherein:
the optical receiver is further configured to convert the received modulated optical signal into a second in-phase digital signal and a second quadrature-phase digital signal that have a second set of signal samples corresponding to a data frame; and
the optical receiver is further configured to process the first set of signal samples together with the second set of signal samples to recover the data encoded both in the first sequence of constellation symbols and in the second sequence of constellation symbols.

12. The optical transport system of claim 11, wherein:
the first plurality of pilot-symbol blocks comprises:
  a first channel-estimation block having a first polyphase sequence of symbols; and
  a second channel-estimation block having a second polyphase sequence of symbols different from the first polyphase sequence of symbols; and
the second plurality of pilot-symbol blocks comprises:
  a third channel-estimation block having the second polyphase sequence; and
  a fourth channel-estimation block having the first polyphase sequence, wherein:
    the first channel-estimation block is synchronous with the third channel-estimation block; and
    the second channel-estimation block is synchronous with the fourth channel-estimation block.

13. An optical communication method, comprising:
converting a first data stream into a first sequence of constellation symbols;
generating a data frame that comprises:
  a first plurality of pilot-symbol blocks, wherein each pilot-symbol block comprises a respective plurality of pilot symbols and a respective guard interval; and a first set of one or more payload-symbol blocks, wherein each payload-symbol block comprises a respective plurality of constellation symbols from the first sequence;

modulating an optical carrier to generate a modulated optical signal for transmission of the data frame over an optical communication link, wherein:

at least one payload-symbol block and another block are concatenated without a guard interval between them; and the other block is either a pilot-symbol block or a payload-symbol block; and generating a frame-synchronization block for the first plurality of pilot-symbol blocks by:

selecting 2N orthogonal frequencies, where N is a positive integer;

consecutively numbering said frequencies starting from a lowest frequency and ending with a highest frequency;

assigning a zero-amplitude symbol to each of the odd-numbered frequencies;

assigning a symbol that is randomly selected from a QPSK constellation to each of the even-numbered frequencies; and applying an inverse fast-Fourier-transform (IFFT) operation to a resulting set of 2N frequency-domain symbols to generate a string of time-domain symbols for the frame-synchronization block.

14. The method of claim 13, wherein the first plurality of pilot-symbol blocks comprises a channel-estimation block having a first polyphase sequence of symbols, which has been generated from a second polyphase sequence of symbols using one or more of the following:

cyclically shifting the second polyphase sequence;

phase shifting each symbol of the second polyphase sequence by a constant phase;

taking an m-th power of each symbol of the second polyphase sequence, where m is an integer greater than one; and phase-conjugating the second polyphase sequence.

15. The method of claim 14, wherein the second polyphase sequence has a constant amplitude and a phase pattern defined by phase sequence $\phi_1(n)$ or phase sequence $\phi_2(n)$, where $\phi_1(n)=-\pi(n-1)^2/N$; $\phi_2(n)=-\pi n(n-1)/N$; n=1, 2, . . . , 2N; and N is a positive integer.

16. The method of claim 13, further comprising converting a second data stream into a second sequence of constellation symbols, wherein the data frame further comprises:

a second plurality of pilot-symbol blocks, wherein each pilot-symbol block comprises a respective plurality of pilot symbols and a respective guard interval; and a second set of one or more payload-symbol blocks, wherein:

each payload-symbol block of the second set comprises a respective plurality of constellation symbols from the second sequence;

a first polarization of the modulated optical is modulated with the symbols of the first plurality of pilot-symbol blocks and the first set of one or more payload-symbol blocks; and a second polarization of the modulated optical is modulated with the symbols of the second plurality of pilot-symbol blocks and the second set of one or more payload-symbol blocks.

17. The method of claim 16, wherein:

the first plurality of pilot-symbol blocks comprises:

a first channel-estimation block having a first polyphase sequence of symbols; and a second channel-estimation block having a second polyphase sequence of symbols different from the first polyphase sequence of symbols; and the second plurality of pilot-symbol blocks comprises:

a third channel-estimation block having the second polyphase sequence; and a fourth channel-estimation block having the first polyphase sequence, wherein:

the first channel-estimation block is synchronous with the third channel-estimation block; and the second channel-estimation block is synchronous with the fourth channel-estimation block.

18. An optical transmitter, comprising:

a digital signal processor configured to convert a first data stream into a first sequence of constellation symbols and to generate a data frame that comprises:

a first plurality of pilot-symbol blocks, wherein each pilot-symbol block comprises a respective plurality of pilot symbols and a respective guard interval; and a first set of one or more payload-symbol blocks, wherein each payload-symbol block comprises a respective plurality of constellation symbols from the first sequence; and an optical modulator configured to modulate an optical carrier to generate a modulated optical signal for transmission of the data frame over an optical communication link, wherein:

at least one payload-symbol block and another block are concatenated without a guard interval between them;

the other block is either a pilot-symbol block or a payload-symbol block;

the digital processor is further configured to convert a second data stream into a second sequence of constellation symbols, wherein the data frame further comprises:

a second plurality of pilot-symbol blocks, wherein each pilot-symbol block comprises a respective plurality of pilot symbols and a respective guard interval; and a second set of one or more payload-symbol blocks, wherein each payload-symbol block of the second set comprises a respective plurality of constellation symbols from the second sequence;

the optical modulator is further configured to modulate a first polarization of the modulated optical signal with the symbols of the first plurality of pilot-symbol blocks and the first set of one or more payload-symbol blocks;

the optical modulator is further configured to modulate a second polarization of the modulated optical signal with the symbols of the second plurality of pilot-symbol blocks and the second set of one or more payload-symbol blocks;

the first plurality of pilot-symbol blocks comprises a first frame-synchronization block having a first string of N pilot symbols concatenated with a second string of N pilot symbols, said second string being a copy of the first string, where N is a positive integer;

the second plurality of pilot-symbol blocks comprises a second frame-synchronization block having a third string of N pilot symbols concatenated with a fourth string of N pilot symbols, said fourth string being a copy of the third string; and the third string is different from the first string.

19. An optical transmitter, comprising:
a digital signal processor configured to convert a first data stream into a first sequence of constellation symbols and generates a data frame that comprises:
  a first plurality of pilot-symbol blocks, wherein each pilot-symbol block comprises a respective plurality of pilot symbols and a respective guard interval; and
  a first set of one or more payload-symbol blocks, wherein each payload-symbol block comprises a respective plurality of constellation symbols from the first sequence; and
an optical modulator configured to modulate an optical carrier to generate a modulated optical signal for transmission of the data frame over an optical communication link, wherein:
  at least one payload-symbol block and another block are concatenated without a guard interval between them;
  the other block is either a pilot-symbol block or a payload-symbol block;
  the digital processor is further configured to convert a second data stream into a second sequence of constellation symbols, wherein the data frame further comprises:
    a second plurality of pilot-symbol blocks, wherein each pilot-symbol block comprises a respective plurality of pilot symbols and a respective guard interval; and
    a second set of one or more payload-symbol blocks, wherein each payload-symbol block of the second set comprises a respective plurality of constellation symbols from the second sequence;
  the optical modulator is further configured to modulate a first polarization of the modulated optical signal with the symbols of the first plurality of pilot-symbol blocks and the first set of one or more payload-symbol blocks; and
  the optical modulator is further configured to modulate a second polarization of the modulated optical signal with the symbols of the second plurality of pilot-symbol blocks and the second set of one or more payload-symbol blocks;
  the first plurality of pilot-symbol blocks comprises:
    a first channel-estimation block having a first polyphase sequence of symbols; and
    a second channel-estimation block having a second polyphase sequence of symbols different from the first polyphase sequence of symbols; and
  the second plurality of pilot-symbol blocks comprises:
    a third channel-estimation block having the second polyphase sequence; and
    a fourth channel-estimation block having the first polyphase sequence, wherein:
      the first channel-estimation block is synchronous with the third channel-estimation block; and
      the second channel-estimation block is synchronous with the fourth channel-estimation block.

20. An optical transport system, comprising:
an optical transmitter; and
an optical receiver coupled to the optical transmitter via an optical communication link, wherein:
  the optical transmitter is configured to convert a first data stream into a first sequence of constellation symbols and generates a data frame that comprises:
    a first plurality of pilot-symbol blocks, wherein each pilot-symbol block comprises respective plurality of pilot symbols and a respective guard interval; and
    a first set of one or more payload-symbol blocks, wherein each payload-symbol block comprises a respective plurality of constellation symbols from the first sequence;
  at least one payload-symbol block and another block are concatenated without a guard interval between them, wherein the other block is either a pilot-symbol block or a payload-symbol block;
  the optical transmitter is configured to modulate an optical carrier to generate a modulated optical signal having encoded thereon the data frame and to apply said modulated optical signal to the optical communication link;
  the optical receiver is configured to receive the modulated optical signal from the optical communication link and to convert the received modulated optical signal into a first in-phase digital signal and a first quadrature-phase digital signal that have a first set of signal samples corresponding to the data frame;
  the optical receiver is configured to process the first set of signal samples to recover the data encoded in the first sequence of constellation symbols;
  the optical transmitter is further configured to convert a second data stream into a second sequence of constellation symbols, wherein the data frame further comprises:
    a second plurality of pilot-symbol blocks, wherein each pilot-symbol block comprises a respective plurality of pilot symbols and a respective guard interval; and
    a second set of one or more payload-symbol blocks, wherein each payload-symbol block of the second set comprises a respective plurality of constellation symbols from the second sequence;
  the optical transmitter is further configured to modulate a first polarization of the modulated optical signal with the symbols of the first plurality of pilot-symbol blocks and the first set of one or more payload-symbol blocks;
  the optical transmitter is further configured to modulate a second polarization of the modulated optical signal with the symbols of the second plurality of pilot-symbol blocks and the second set of one or more payload-symbol blocks;
  the first plurality of pilot-symbol blocks comprises:
    a first channel-estimation block having a first polyphase sequence of symbols; and
    a second channel-estimation block having a second polyphase sequence of symbols different from the first polyphase sequence of symbols; and
  the second plurality of pilot-symbol blocks comprises:
    a third channel-estimation block having the second polyphase sequence; and
    a fourth channel-estimation block having the first polyphase sequence, wherein:
      the first channel-estimation block is synchronous with the third channel-estimation block; and
      the second channel-estimation block is synchronous with the fourth channel-estimation block.

21. An optical communication method, comprising:
converting a first data stream into a first sequence of constellation symbols;
generating a data frame that comprises:
  a first plurality of pilot-symbol blocks, wherein each pilot-symbol block comprises a respective plurality of pilot symbols and a respective guard interval; and a first set of one or more payload-symbol blocks, wherein each payload-symbol block comprises a respective plurality of constellation symbols from the first sequence; and modulating an optical carrier to generate a modulated optical signal for transmission of the data frame over an optical communication link, wherein:

at least one payload-symbol block and another block are concatenated without a guard interval between them;

the other block is either a pilot-symbol block or a payload-symbol block; and the first plurality of pilot-symbol blocks comprises a channel-estimation block having a first polyphase sequence of symbols, which has been generated from a second polyphase sequence of symbols using one or more of the following:

cyclically shifting the second polyphase sequence;

phase shifting each symbol of the second polyphase sequence by a constant phase;

taking an m-th power of each symbol of the second polyphase sequence, where m is an integer greater than one; and phase-conjugating the second polyphase sequence.

22. The method of claim 21, wherein the second polyphase sequence has a constant amplitude and a phase pattern defined by phase sequence $\phi_1(n)$ or phase sequence $\phi_2(n)$, where $\phi_1(n)=-\pi(n-1)^2/N$; $\phi_2(n)=-\pi n(n-1)/N$; $n=1, 2, \ldots, 2N$; and N is a positive integer.

23. An optical communication method, comprising:

converting a first data stream into a first sequence of constellation symbols;

generating a data frame that comprises:

a first plurality of pilot-symbol blocks, wherein each pilot-symbol block comprises a respective plurality of pilot symbols and a respective guard interval; and a first set of one or more payload-symbol blocks, wherein each payload-symbol block comprises a respective plurality of constellation symbols from the first sequence;

modulating an optical carrier to generate a modulated optical signal for transmission of the data frame over an optical communication link, wherein:

at least one payload-symbol block and another block are concatenated without a guard interval between them; and the other block is either a pilot-symbol block or a payload-symbol block; and converting a second data stream into a second sequence of constellation symbols, wherein the data frame further comprises:

a second plurality of pilot-symbol blocks, wherein each pilot-symbol block comprises a respective plurality of pilot symbols and a respective guard interval; and a second set of one or more payload-symbol blocks, wherein:

each payload-symbol block of the second set comprises a respective plurality of constellation symbols from the second sequence;

a first polarization of the modulated optical is modulated with the symbols of the first plurality of pilot-symbol blocks and the first set of one or more payload-symbol blocks;

a second polarization of the modulated optical is modulated with the symbols of the second plurality of pilot-symbol blocks and the second set of one or more payload-symbol blocks;

the first plurality of pilot-symbol blocks comprises:

a first channel-estimation block having a first polyphase sequence of symbols; and a second channel-estimation block having a second polyphase sequence of symbols different from the first polyphase sequence of symbols; and the second plurality of pilot-symbol blocks comprises:

a third channel-estimation block having the second polyphase sequence; and a fourth channel-estimation block having the first polyphase sequence, wherein:

the first channel-estimation block is synchronous with the third channel-estimation block; and the second channel-estimation block is synchronous with the fourth channel-estimation block.

* * * * *